(12) United States Patent
Cook et al.

(10) Patent No.: US 7,988,104 B1
(45) Date of Patent: Aug. 2, 2011

(54) DRILLING RISER AUXILIARY CLAMP WITH INTEGRAL MUX CLAMP

(75) Inventors: Timothy H. Cook, Kennebunkport, ME (US); Frederick Maguire, South Berwick, ME (US); David A. Capotosto, Biddeford, ME (US)

(73) Assignee: Flotation Technologies, Inc., Biddeford, MN (US)

( * ) Notice: Subject to any disclaimer, the term of this patent is extended or adjusted under 35 U.S.C. 154(b) by 411 days.

(21) Appl. No.: 12/288,908

(22) Filed: Oct. 24, 2008

Related U.S. Application Data

(60) Provisional application No. 61/000,471, filed on Oct. 26, 2007.

(51) Int. Cl.
*F16L 3/22* (2006.01)

(52) U.S. Cl. ...................................... 248/68.1

(58) Field of Classification Search ............. 248/68.1, 248/69, 74.1, 74.4, 62, 63
See application file for complete search history.

(56) References Cited

U.S. PATENT DOCUMENTS

| | | | | |
|---|---|---|---|---|
| 4,099,626 A | * | 7/1978 | Magnussen, Jr. | 211/60.1 |
| 4,813,639 A | * | 3/1989 | Midkiff et al. | 248/68.1 |
| 6,375,017 B1 | * | 4/2002 | Schattner et al. | 211/85.13 |
| 7,500,644 B2 | * | 3/2009 | Naudet et al. | 248/68.1 |
| 2005/0116123 A1 | * | 6/2005 | Bailey et al. | 248/74.1 |
| 2006/0249636 A1 | * | 11/2006 | Thiedig et al. | 248/74.4 |
| 2007/0120023 A1 | * | 5/2007 | Martinez et al. | 248/75 |
| 2007/0246614 A1 | * | 10/2007 | Allmann et al. | 248/65 |
| 2008/0245933 A1 | | 10/2008 | Stokes | |
| 2009/0266945 A1 | * | 10/2009 | Dietrich et al. | 248/74.2 |

FOREIGN PATENT DOCUMENTS

| | | |
|---|---|---|
| AU | 5995798 | 9/1998 |
| AU | 2006318970 | 5/2007 |
| EP | 1850044 | 10/2007 |
| GB | 2288205 | 10/1995 |
| GB | 2322406 | 8/1998 |
| GB | 2391255 | 2/2004 |

* cited by examiner

*Primary Examiner* — Ramon O Ramirez
(74) *Attorney, Agent, or Firm* — James Creighton Wray

(57) ABSTRACT

Segments of open framework auxiliary clamps are fastened together around a drilling riser. The clamps have depressions which mate with recesses in caps to hold auxiliary lines. Larger depressions and recesses hold choke and kill lines. The caps of the choke and kill clamps are extended radially through openings in buoyancy covers as mux clamp mounts. Extensions on mux clamps engage slots in the mux clamp mounts. Opposing channels in the mux clamps and covers hold inserts, with grooves in which multiplex lines are mounted.

11 Claims, 2 Drawing Sheets

DRILLING RISER AUXILIARY CLAMP WITH INTEGRAL MUX CLAMP

This application claims the benefit of U.S. Provisional Application No. 61/000,471, filed Oct. 26, 2007, which is hereby incorporated by reference in its entirety.

SUMMARY OF THE INVENTION

Drilling riser assemblies contain mux (multiplex) clamps to mount multiplex cables during deployment. These mux clamps are traditionally independent subassemblies that are mounted on the choke and kill lines. The invention allows for the mux clamps to be integrated into the auxiliary clamps.

The limitation has to do with the separate subassembly. In addition to the cost, the space required for the separate clamp removes volume from the buoyancy element. This loss of volume corresponds to a loss of buoyancy. With this invention, that loss of volume already inherent in the auxiliary clamp overlaps the loss required for the mux clamp, thereby increasing the buoyancy for the system.

The invention provides new clamp apparatus for subsea drilling riser pipe assemblies. A cylindrical base surrounds the drilling riser pipe. Semi-cylindrical depressions are formed in the base for holding auxiliary lines. Caps have opposite semi-cylindrical recesses complementary to the depressions for receiving and holding the lines between the depressions on the base and the recesses in the caps. Holes in the cylindrical base near the depressions receive fasteners. The fasteners extend through the caps and into the holes for securing the caps on the base and holding the auxiliary lines in the complementary depression and recesses.

Radially extending mux clamp mounts are connected to the choke line and kill line caps. Mux (multiplex) clamps mounted on radially outward ends of the mux clamps mounts. Slots in the radially extending mounts hold the mux clamps. The mux clamps have radially inward extending extensions fitted in the slots that hold the mux clamps in the slots. The mux clamps have outward opening channels and line holding inserts in the channels. Mux clamp covers have complementary inward opening channels, and complementary cover inserts. The complementary inserts have opposing complementary grooves for holding multiple additional lines. The drilling riser pipe is encased in buoyancy coverings, and the radially extending mounts extend outward through openings in the buoyancy coverings. The radially extending mux clamp mounts are blocks. The slots are T-shaped, and the extensions have complementary T-shapes. The T-shaped slots and T-shaped extensions have interference fit. The extensions are pressed into the slots.

The mux clamp mounts are larger blocks having semi-cylindrical bases which are fused with the outer caps of choke line and kill line clamps. Each mount block has parallel opposite sides in axial directions of the drill riser pipe, radially outwardly converging sides between the parallel sides, and a generally flat outward end. The outward end has a first slot extending radially inward between the parallel sides. A second wider perpendicular slot at an inner end of the first slot extends to the parallel sides. The first and second slots form a T-shaped slot. Each mux clamp, inserts and cover form a smaller block having parallel sides and inward converging sides leading to a T-shaped extension, which has a size and shape complementary to the T-shaped slot for press fitting or fusing the T-shaped extension in the T-shaped slot.

The cylindrical clamp base has an open framework, which is formed of segments. Fasteners join the segments around a drilling riser pipe.

The open framework clamp apparatus has choke and kill line clamps for holding choke and kill lines on the framework. The mux clamp mounts are connected to the choke and kill line clamps.

The new method mounts mux (multiplex) line clamps on auxiliary clamps for flexible drilling riser pipes. Caps clamp auxiliary lines and choke and kill lines on the drilling riser. Heavy caps are provided on the kill and choke line clamps to clamp those lines to the auxiliary clamps.

Mux clamp mounts are provided on the kill and choke line clamp caps.

Mux clamps are fixed on the mux clamp mounts. The mux clamp mounts extend outward through radial openings in the buoyancy shells surrounding the drilling riser and choke and kill lines. Lines are clamped on the mux clamps outside of the shells buoyancy.

About 3-10 million dollars of drill riser auxiliary and mux clamps are purchased every year. That amount is rising as the cost of oil rises. This new apparatus and method is a direct replacement for existing product and will provide improved auxiliary clamps and buoyancy elements.

Needs exist for improved drilling riser clamps and mux clamps.

These and further and other objects and features of the invention are apparent in the disclosure, which includes the above and ongoing written specification, with the drawings.

DETAILED DESCRIPTION OF THE PREFERRED EMBODIMENTS

Figure 1:
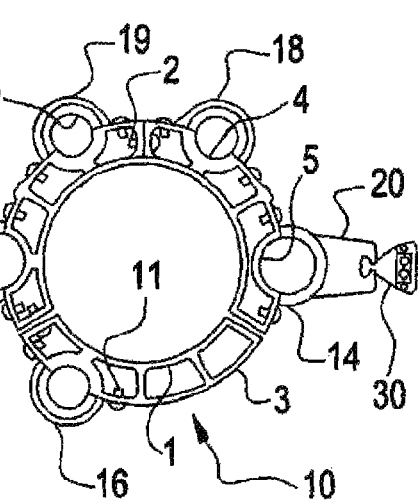
FIG. 1 is an end elevation of a drilling riser auxiliary clamp with integral mux clamp.
Figure 2:
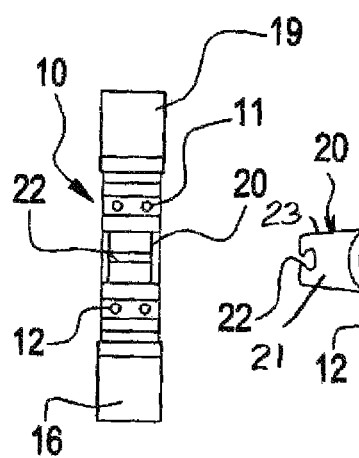
FIG. 2 is a left side elevation of the drilling riser auxiliary clamp with integral mux clamp shown in FIG. 1.
Figure 3:
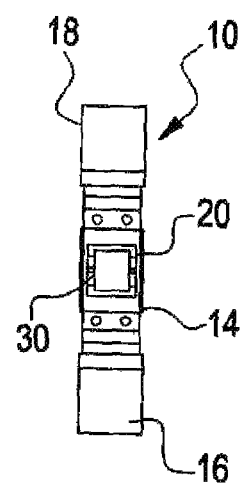
FIG. 3 is a right side elevation of the drilling riser auxiliary clamp with integral mux clamp shown in FIG. 1.
Figure 4:
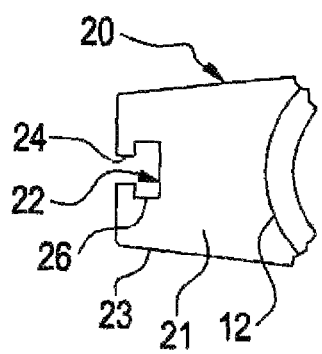
FIG. 4 is a detail of the mux clamp mount shown in FIG. 1.
Figure 5:
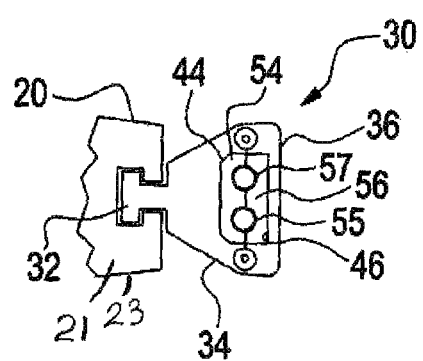
FIG. 5 is a detail of a mux clamp in a mount.

FIGS. 1-5 show an auxiliary clamp 10 for clamping on a drill riser. Clamp 10 has an open framework 1 and is made in three segments 3, which are bolted 2 together. The framework segments have semi-cylindrical smaller depressions 4 and larger depressions 5, which are covered by caps having smaller and larger recesses 8 and 9. Bolts 11 connect the caps to the open framework 1. The auxiliary clamp 10 has a choke line cap 12 and a kill line cap 14, as well as other line caps 16, 18, 19 on the open framework 1 of the auxiliary clamp 10 connected to the drill riser. Mux clamp mounts 20 extend radially from the choke line cap 12 and from the kill line cap 14. The caps 12, 14, 16, 18 and 19 are bolted 11 to the auxiliary clamp 10.

Each mux clamp mount 20 has opposite parallel walls 21 and sloping walls 23. A mux clamp mounting slot 22 in outer end 25 is provided for mounting a mux clamp 30. The mounting slot 22 has a first slot portion 24 extending inward from outer end 25 of the mux clamp mount 20. A second slot portion 26 extends perpendicularly through parallel walls 21. Each mux clamp has a body with an extension 32 for mounting in the mux clamp mounting slot in an interference fit. An inner member 34 is connected to the extension 32, and an outer cover member 36 is bolted to the inner member. Channels 44 and 46 in the inner and outer members hold insert parts 54 and 56 with grooves 55 and 57, which fixedly mount multiplex cables during drilling riser deployment.

Figure 6:
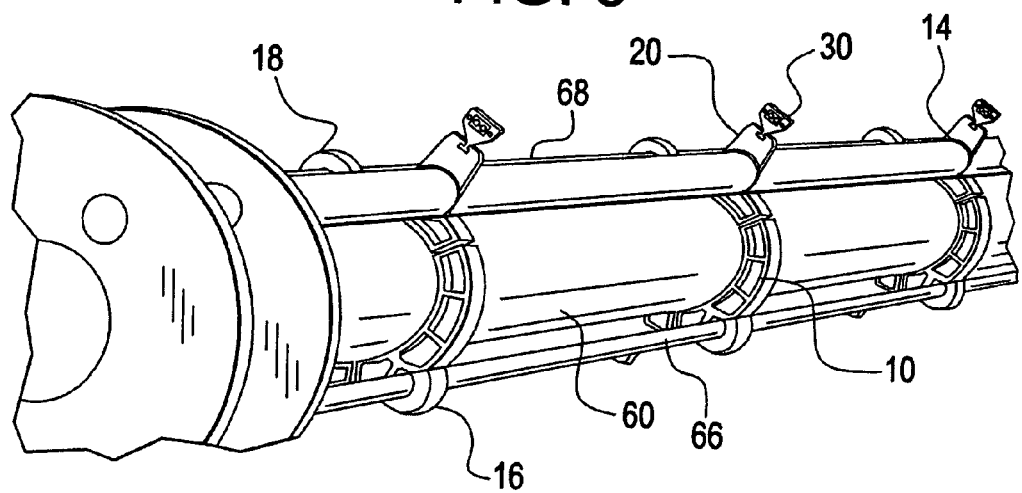
FIG. 6 is a perspective view of a drilling riser auxiliary clamp with integral mux clamp.
Figure 7:
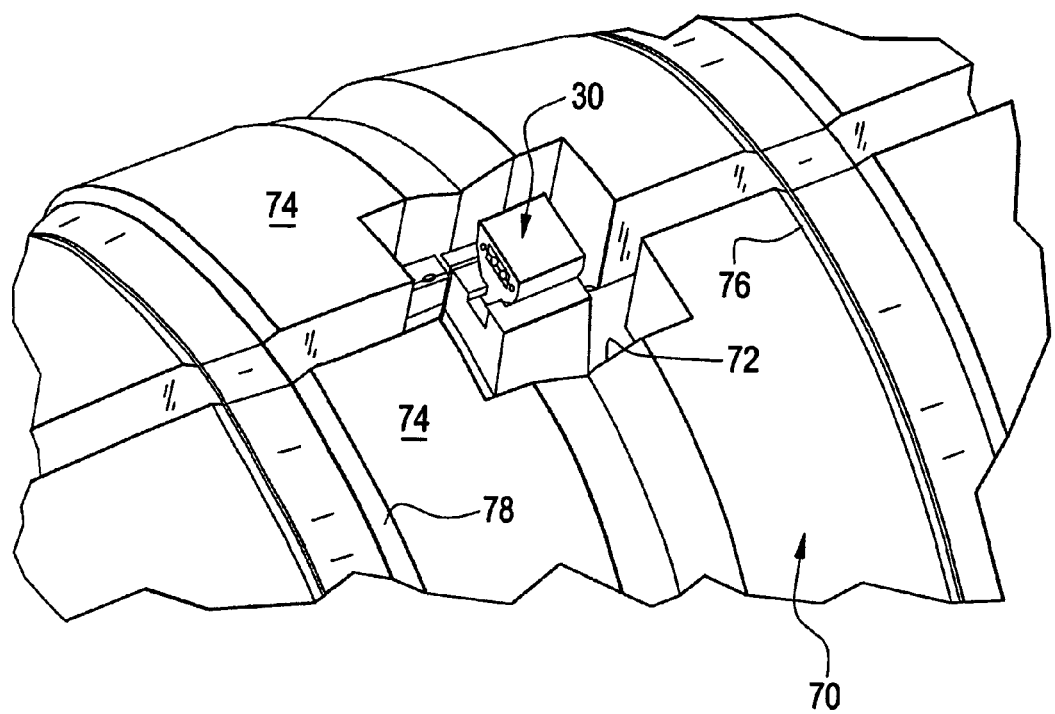
FIG. 7 is a detail of a mux clamp mount and a mux clamp shown in FIG. 6.

As shown in FIG. 6, the auxiliary clamps 10 are located along the drill riser 60. Mounts 16, 18 attached to the auxiliary clamps 10 mount auxiliary lines 66, 68.

The mux clamp mounts 20 radially extend from the larger choke line mounts and kill line mounts 14, as shown in FIG. 6. The mux clamp mounts 20 hold the mux clamps 30 spaced away from the riser 60.

The mux clamp mounts 30 extend through small rectangular radial openings 72 in the buoyant covers 70.

The buoyant covers 70 are formed in halves 74 which are held together by straps 76 in grooves 78.

The drilling riser assemblies 60 contain mux (multiplex) clamps 30 to mount multiplex cables during deployment. These mux clamps 30 are independent subassemblies that are mounted on and have bases which form the choke and kill line mounts 12, 14. The invention allows for the mux clamps 30 to be integrated into the auxiliary clamps 10.

The invention avoids a separate subassembly. In addition to the cost savings, the savings in space required for the separate clamp removes only small limited volumes from the buoyancy elements. Loss of volume corresponds to a loss of buoyancy. With this invention, that loss of volume already inherent in the auxiliary clamp 10 overlaps the loss required for the mux clamp 30, thereby increasing the buoyancy for the system.

While the invention has been described with reference to specific embodiments, modifications and variations of the invention may be constructed without departing from the scope of the invention.

We claim:

1. Clamp apparatus for subsea drilling riser pipe assemblies comprising:
   a cylindrical base surrounding the drilling riser pipe,
   semi-cylindrical depressions in the base for holding auxiliary lines,
   caps having opposite semi-cylindrical recesses complementary to the depressions for receiving and holding the lines between the depressions on the base and the recesses in the caps,
   holes in the cylindrical base near the depression for receiving fasteners,
   fasteners extending through the caps and into the holes for securing the caps on the base and holding the auxiliary lines in the complementary depression and recesses,
   radially extending mux clamp mounts connected to the caps, and
   mux (multiplex) clamps mounted on radially outward ends of the mux clamps mounts.

2. The clamp apparatus of claim 1, further comprising:
   slots in the radially extending mounts for holding mux clamps,
   the mux clamps having radially inward extending extensions fitted in the slots for holding the mux clamps in the slots.

3. The clamp apparatus of claim 1, wherein the mux clamps have outward opening channels, inserts in the channels and covers with complementary inward opening channels, and complementary cover inserts in the cover complementary inward opening channels, wherein the inserts have opposing complementary grooves for holding multiple additional lines.

4. The clamp apparatus of claim 1, wherein the drilling riser pipe is encased in buoyancy coverings, and wherein the radially extending mounts extend outward through openings in the buoyancy coverings.

5. The clamp apparatus of claim 1, wherein the radially extending mounts are blocks.

6. The clamp apparatus of claim 1, wherein the slots are T-shaped and the extensions have complementary T-shapes, and wherein the T-shaped slots and T-shaped extensions have interference fit.

7. The clamp apparatus of claim 6, wherein the extensions are pressed into the slots.

8. The clamp apparatus of claim 6, wherein the mounts are larger blocks having semi-cylindrical bases which are fused with the outer caps of choke line and kill line clamps and wherein each mount block has parallel opposite sides in axial directions of the drill riser pipe and outwardly converging sides between the parallel sides, and a generally flat radially outward end, wherein the outward end has a first slot extending radially inward between the parallel sides and further comprising a second wider perpendicular slot at an inner end of the first slot extending between the parallel sides, and wherein the first and second slots form the T-shaped slot, and wherein each mux clamp inserts and cover form a smaller block having parallel sides and inward converging sides, leading to the T-shaped extension which has a size and shape complementary to the T-shaped slot for press fitting or fusing the T-shaped extension in the T-shaped slot.

9. The clamp apparatus of claim 1, wherein the cylindrical base has an open framework and is formed of segments and fasteners joining the segments together around the drilling riser pipe.

10. The clamp apparatus of claim 1, having choke and kill line clamps for holding choke and kill lines and wherein the mux clamp mounts are connected to the choke and kill line clamps.

11. A method of mounting mux (multiplex) line clamps on auxiliary clamps for auxiliary lines, and choke and kill lines on a drilling riser providing kill and choke line clamps on an auxiliary clamp,
   providing a mux clamp mounts on the kill and choke line clamps,
   providing mux clamps on the mux clamp mounts,
   mounting an auxiliary clamp on a drilling riser,
   clamping kill and choke lines and the mux clamp mounts on the auxiliary clamp, and
   securing multiple lines in the mux clamp.

* * * * *